United States Patent
Hooti et al.

(10) Patent No.: US 9,625,003 B2
(45) Date of Patent: Apr. 18, 2017

(54) SECUREMENT APPARATUS

(71) Applicants: Mahmood Hooti, Milton (CA); Sami Elkhazin, Toronto (CA); Sarper Arun, Richmond Hill (CA); Ronald Guenter Giessmann, Etobicoke (CA); Karl Lucas Peterman, Pickering (CA)

(72) Inventors: Mahmood Hooti, Milton (CA); Sami Elkhazin, Toronto (CA); Sarper Arun, Richmond Hill (CA); Ronald Guenter Giessmann, Etobicoke (CA); Karl Lucas Peterman, Pickering (CA)

(73) Assignee: BVA SYSTEMS LTD., Toronto (CA)

( * ) Notice: Subject to any disclaimer, the term of this patent is extended or adjusted under 35 U.S.C. 154(b) by 94 days.

(21) Appl. No.: 14/090,637

(22) Filed: Nov. 26, 2013

(65) Prior Publication Data
US 2015/0143671 A1    May 28, 2015

(51) Int. Cl.
*F16G 11/06*    (2006.01)
*F16G 11/14*    (2006.01)

(52) U.S. Cl.
CPC .............. *F16G 11/06* (2013.01); *F16G 11/14* (2013.01); *Y10T 24/3978* (2015.01); *Y10T 29/49826* (2015.01)

(58) Field of Classification Search
CPC ...... F16G 11/06; F16G 11/14; Y10T 24/3978; Y10T 29/49826
USPC ....................................................... 24/136 B
See application file for complete search history.

(56) References Cited

U.S. PATENT DOCUMENTS

| | | | |
|---|---|---|---|
| 4,342,477 A * | 8/1982 | McClure | 292/307 R |
| 4,706,345 A | 11/1987 | Rockenfeller et al. | |
| 4,733,648 A | 3/1988 | Martin | |
| 5,020,192 A * | 6/1991 | Gerlach | 24/136 R |
| 5,743,574 A * | 4/1998 | Kohn | 292/315 |
| 5,979,958 A | 11/1999 | Van Damme | |
| 6,044,674 A * | 4/2000 | Rushing et al. | 70/232 |
| 6,327,753 B1 | 12/2001 | Rushing | |
| 6,394,693 B1 | 5/2002 | Muller-Peddinghaus | |
| 7,172,225 B2 | 2/2007 | Foigel et al. | |
| 7,204,107 B2 * | 4/2007 | Leyden et al. | 70/18 |
| 7,264,287 B2 * | 9/2007 | Ching | 292/315 |
| 8,302,265 B1 | 11/2012 | Gretz | |

(Continued)

*Primary Examiner* — Victor Batson
*Assistant Examiner* — David Upchurch
(74) *Attorney, Agent, or Firm* — Norton Rose Fulbright Canada LLP; Christopher N. Hunter (57) ABSTRACT

A securement apparatus including a securing body and an engaging member is provided. The securing body may include a first passage therethrough for receiving one or more retention members in a looped configuration with first and second legs of the loop extending through the first passage, wherein a first side of the first passage has a generally uniform surface generally configured to conform to a periphery of at least one of the one or more retention members; and a second passage meeting the first passage. The engaging member may be securable within said second passage and positionable within the second passage to retain the one or more retention members within the first passage by encouraging a position of the one or more retention members to rest within the surface and by pinching both the first and second legs of the loop between the surface and the engaging member.

9 Claims, 7 Drawing Sheets

(56) References Cited

U.S. PATENT DOCUMENTS

2005/0015940 A1   1/2005  Stafford
2010/0132166 A1   6/2010  Vargas

* cited by examiner

SECUREMENT APPARATUS

TECHNICAL FIELD

The present disclosure relates generally to a mechanical apparatus, in particular a securement apparatus that is adapted to transfer a force or a load in one or more retention members.

BACKGROUND

Cables and other kinds of retention devices are often used to sustain weight, transfer loads and forces and otherwise secure objects or structures. Special cables, such as aircraft cables, can be designed for use in aircraft industries and military applications. Cables, wires, and ropes are also used in many general-purpose applications such as slings, winch lines, and more. When in use, a cable (or wire or rope) is typically secured onto a body or a structure (such as a cargo plane) by a clamp or some other kind of a securement apparatus.

A retention device may also be designed for applications where extreme events such as earthquake (seismic) and/or wind loads act on components or structures. That is, such a retention device transferring a load, or force, may endure movements, including movements caused by earthquakes (seismic) bomb blasts and wind, without a reduced rate of failure.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

In accordance with a first embodiment, there may be provided a securement apparatus comprising: 1) a securing body including: a first passage therethrough for receiving one or more retention members, wherein a first side of the first passage has a generally uniform surface generally configured to conform to a periphery of at least one of the one or more retention members; and a second passage meeting the first passage; and 2) an engaging member securable within said second passage, the engaging member being positionable within the second passage to retain the one or more retention members within the first passage by encouraging a position of the one or more retention members to rest within the surface.

Further in accordance with the first embodiment, the securement apparatus may further include a securing member, wherein an end of the securing member defines the surface and is retained within a third passage of the securing body, the third passage meeting the first passage.

Still further in accordance with the first embodiment, the generally uniform surface may be a smooth surface.

Still further in accordance with the first embodiment, the generally uniform surface may be a curved surface.

Still further in accordance with the first embodiment, the second passage may be threaded and the engaging member threaded therein, and the engaging member may be securable within the second passage.

Still further in accordance with the first embodiment, the third passage may be threaded and the securing member may be a bolt threaded therein, the bolt being destructively held in place by the first passage intersecting an end of the bolt to define the surface.

In accordance with an second embodiment, a method of manufacturing a securement apparatus may be provided comprising the steps of: 1) inserting a securing member into a securing body; and 2) forming a first passage through the securing body for receiving one or more retention members, wherein the first passage is through part of the securing member, and wherein a first side of the first passage has a generally uniform surface generally configured to conform to a periphery of at least one of the retention members.

Further in accordance with the second embodiment, a further step may be forming a second passage for receiving an engagement member.

Still further in accordance with the second embodiment, the first passage may be formed by machining, laser-cutting, plasma-cutting, or die-casting, and an end of the securing member may be destroyed by the forming of the first passage.

Still further in accordance with the second embodiment, the securement apparatus may be manufactured with off-the-shelf products or readily available hardware.

In accordance with a third embodiment, there is provided a securement apparatus kit comprising: a securing body; and an engaging member.

Further in accordance with the third embodiment, the securement apparatus kit may comprise one or more retention members.

Still further in accordance with the third embodiment, the securing body may include: 1) a first passage therethrough for receiving one or more retention members, wherein a first side of the first passage has a generally uniform surface generally configured to conform to a periphery of at least one of the one or more retention members; and 2) a second passage meeting the first passage.

Still further in accordance with the third embodiment, the engaging member may be securable within said second passage, the engaging member being positionable within the second passage to retain the one or more retention members within the first passage by encouraging a position of the one or more retention members to rest within the surface.

Still further in accordance with the third embodiment, the securing body may further comprise a securing member, wherein an end of the securing member defines the surface and is retained within a third passage of the securing body, the third passage meeting the first passage.

Still further in accordance with the third embodiment, the generally uniform surface may be a smooth surface.

Still further in accordance with the third embodiment, the generally uniform surface may be a curved surface.

Still further in accordance with the third embodiment, the second passage may be threaded and the engaging member threaded therein, and the engaging member may be securable within the second passage.

Still further in accordance with the third embodiment, the third passage may be threaded and the securing member may be a bolt threaded therein, the bolt being destructively held in place by the first passage intersecting an end of the bolt to define the surface.

Still further in accordance with the third embodiment, the securement apparatus kit may further comprise a second securing body and a second engaging member.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

Some of the conventional tie down or cable locking mechanisms may damage the "live" end of a retention member (i.e., portion of the retention member that carries a load or force). This may weaken the live end of the retention member that transfers the load or force and this may lead to failure. This invention may reduce point loading and or damaging the live section of the retention member such as cable or wire or rope.

It is also desired that a securement apparatus is easy to operate for a user, where the user can set the assembly into a secured (or closed) position with a simple tool or driver such as an Allen key or a wrench.

In addition, it is further desired that such a securement apparatus is simple to manufacture on an assembly line with readily available standard parts.

Note that there may be a tradeoff between cost of manufacturing and flexibility of the securement apparatus. In addition, conventional tie-down mechanism may be bulky, heavy or otherwise less desirable. Improvement is thus desired.

In the present disclosure, a securement apparatus is described, which provides securement for applications such as with earthquake (seismic) and wind load and may be relatively simple to manufacture with preferably off-the-shelf parts or readily available standard hardware. Furthermore the securement apparatus product may be manufactured at a reasonable cost.

It is noted that various connections are set forth between elements in the following description and in the drawings. It is noted that these connections in general and, unless specified otherwise, may be direct or indirect and that this specification is not intended to be limiting in this respect.

Figure 1:
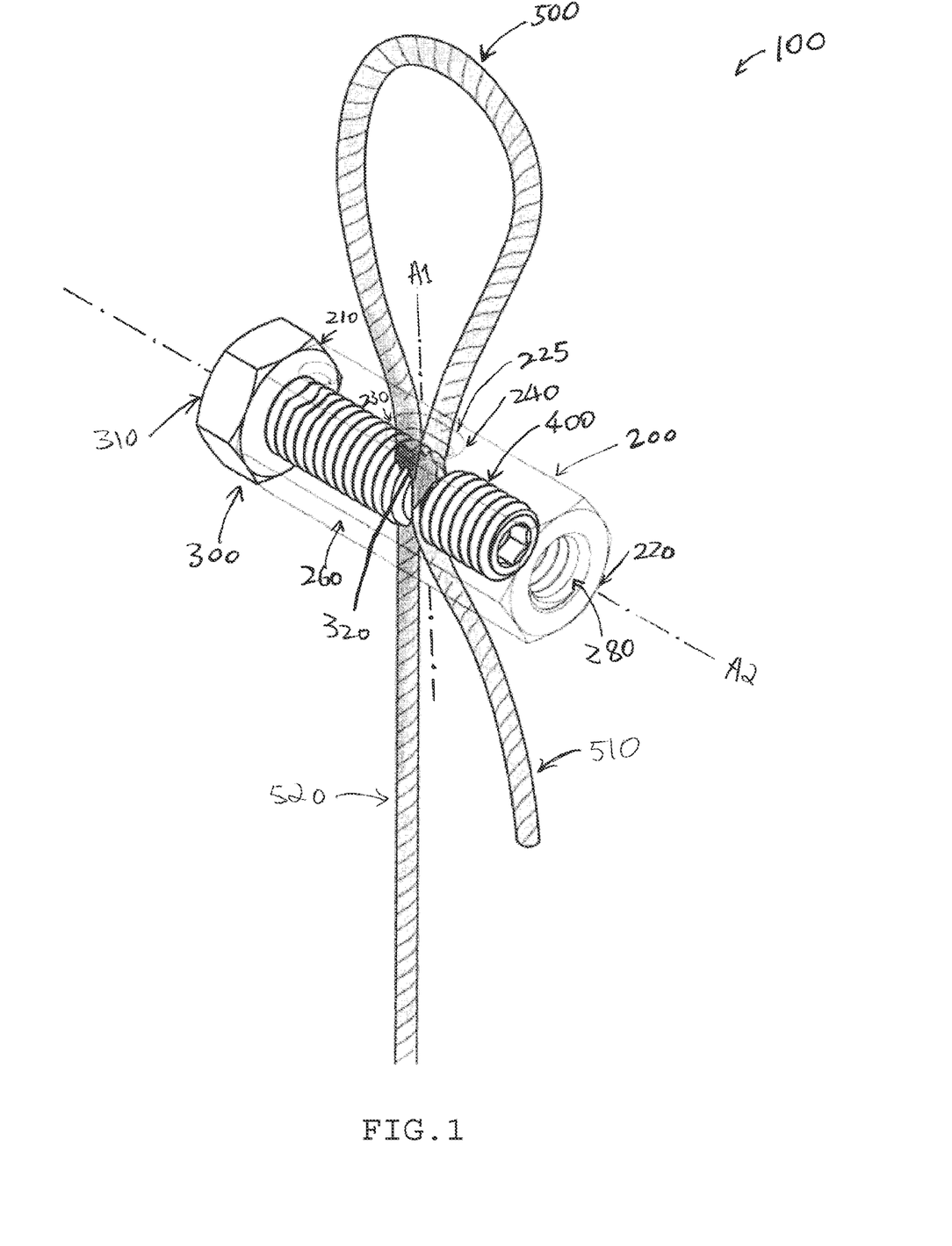
FIG. 1 shows a perspective view of an example embodiment of a securement apparatus 100 in operation with a retention member 500.

FIG. 1 illustrates an example embodiment of a securement apparatus 100 in operation with a retention member 500 in accordance with one or more aspects of this disclosure. In particular, in FIG. 1 a securement apparatus 100 is shown together with a retention member 500, the securement apparatus 100 has a securing body 200 (shown in phantom outline for easy of illustration of internal components) and an engaging member 400. The securing body 200 is shown to have a securing member 300 on a first end of the 210 of the securing body 200. The securing body 200 in this example embodiment is shown to have a hexagonal shape. However, it may be any shape suitable for the purpose of the invention. For example, the securing body 200 may be of a round, square or oval shape. It may also be of an irregular shape.

It is noted that various configurations of the securement apparatus 100 including any one (or more) of the securing body 200, the securing member 300 and the engaging member 400 are possible and the illustrations in the drawings are not meant to be limiting. For example, even though in the example embodiments shown, the retention member 500 does not form part of the securement apparatus 100, in another configuration a securement apparatus 100, for example in a kit, may or may not include the retention member 500. In addition, a securing body 200 may or may not include the securing member 300 or the engaging member 400.

Turning back to FIG. 1, it is shown that the securing body 200 has a first end 210, a second end 220 opposite to the first end 210, a first passage 225, a second passage 280 and an outer surface 260. The first passage 225 has two opposite facing ends: a first side 230 and a second side 240. The first passage has an axis A1. The second passage has an axis A2 which may intersect first end 210 and second; end 220 of the securing body 200. Axis A1 and A2 may or may not be perpendicular. In addition, axis A1 may or may not be parallel to the first side 230 or the second side 240 of the first passage 225. A third passage may also extend from the first end 210 of the securing body 200 to the first side 230 of the first passage 225, meeting the first passage 225. The third passage may also meet the second passage 280. Furthermore, the first passage 225 and the second passage 280, and optionally with the third passage, may intersect to form a void through which one or more retention members may pass. The void may be of any shape or form to permit securement of one or more retention members in accordance with one or more aspects of the invention.

Figure 3A:
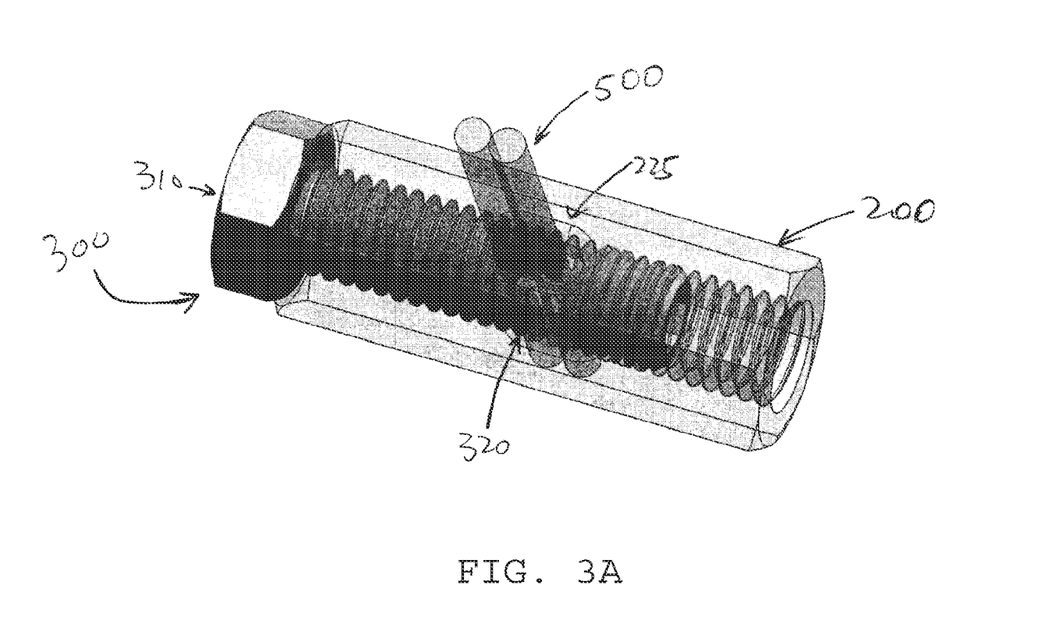
FIG. 3A shows an example embodiment of a securing body 200 in operation with an engaging member 400 inserted.
Figure 3B:
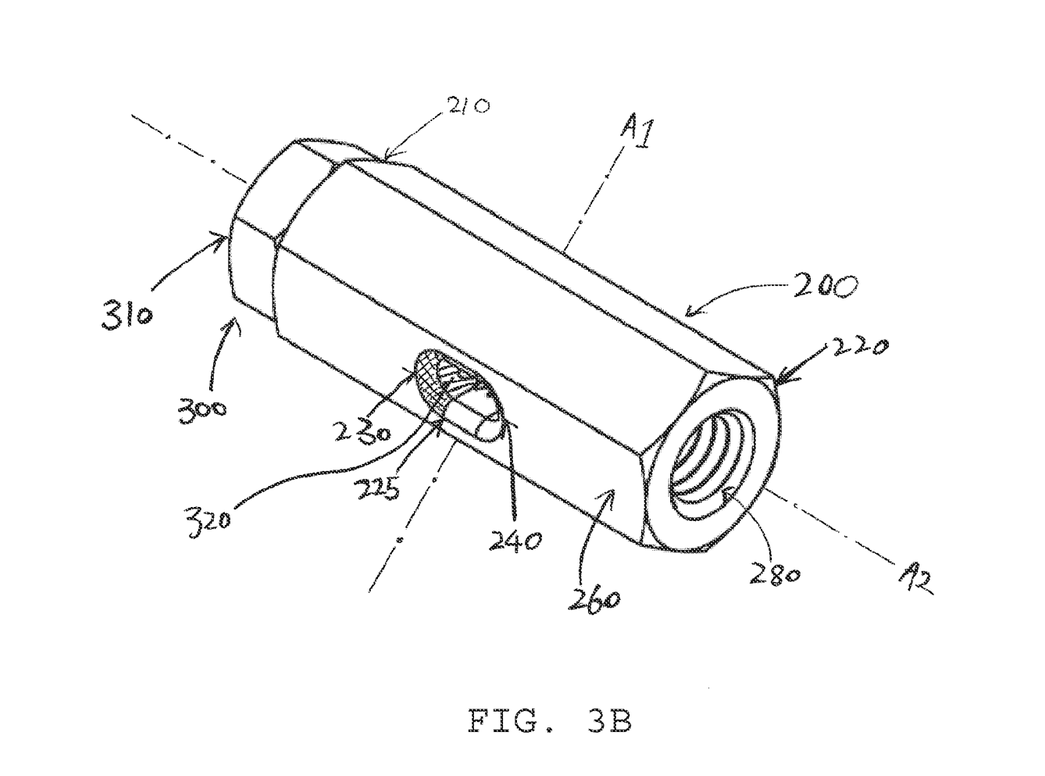
FIG. 3B shows another example embodiment of a securing body 200 without an engaging member 400.

The first passage 225 may be positioned somewhere in, or in an embodiment close to the middle of, the securing body 200 generally adjacent or along the axis A2, as shown in FIG. 1 and more clearly in FIG. 3B. However, it can also be located anywhere else in the securing body 200. Turning briefly to FIG. 3B, an example embodiment of a securing body 200 without an engagement member 400 is shown. The securing body 200 comprises a securing member 300, which is described in detail below, at the first end 210 of the securing body 200. As previously stated, the first passage 225 may have a first side 230 and a second side 240. The first side 230 may be defined as the side closest to the first end 210 of the securing body 200. In the drawing shown in FIG. 3B, for clarity, the first side 230 is generally shown to be the shaded area. However, the surface area of the first side 230 may be smaller or larger than the shaded area shown here. The first side 230 may have a generally uniform surface, which may be generally smooth, and may generally correspond to the surface or a periphery of one or more retention members 500. That is, in an embodiment, the curvature or another shape of the first side 230 may match or conform to the curvature or another shape of the retention member 500. A retention member 500 may be, for example, a cable, a rope, a wire, or any structure that may be capable of transferring a load or force and which engages within a passage of a securing body.

In another example the combination of side 230 of securing body 200 and second end 320 of the securing member 300 may provide a saddle for live end 520 of the retention member 500 that may match or conform to the curvature of live end 520.

In another example embodiment, the retention member 500 may be a steel cable with a generally circular or round cross-section. Accordingly, the first side 230 of the first passage 225 of the securing body 200 can have a smooth, curved (or concave) surface corresponding to the surface of one or more steel cables. Such a generally smooth surface may ensure that limited or no sharp edges, unduly small radius, or incongruent shape is present in the first side 230 of the first passage 225. This may prevent the securing body, or any component inside the securing body, from interfering with the live end of the cable and consequently encouraging damage or weakening the cable and leading to possible failure.

As will be described below, a proper seat or saddle for the retention members 500 may allow the pressure applied to the retention members 500 to be distributed more evenly on the live end of the retention member and thus to reduce the possibility of excessive stress.

Turning back to FIG. 1, the securing body 220 may have a second passage 280. The diameter of the second passage 280 may be any suitable size or dimension. In one example embodiment, it may have a size to fit an engaging member 400. The second passage 280 optionally has a threaded inner surface. The second passage 280 may extend from the second side 240 of the first passage 225 to the second end 220 of the securing body 200.

A securing member 300 may also form part of the securing body 200. Alternatively, it may be a separate entity from the securing body 200. In some embodiments, a securing member 300 may be secured to, attached to, integrated with, or otherwise be made part of securing body 200 within a passage. The attachment, integration, securement or fixing of the securing member 300 to the securing body 200 may be in a releasable form so that the securing member 300 may be taken out of the securing body 200 without damaging either structure. For example, the securing member 300 can take the form of a bolt or some other form such as a cam or a wedge and that the securing member 300 can be releasably threaded, pressed, pushed or sided into the securing body 200, which may be in the form of a nut-like or cylindrical or conical component. The securing member 300 may be integrated into securing body 200 in various other configurations and the possible embodiments of the invention should not be limited to the embodiments specifically disclosed herein.

An engaging member 400 may also form part of the securing body 200. Alternatively, it may be a separate entity from the securing body 200. In some embodiments, an engaging member 400 may be secured to, attached to, integrated with, or otherwise be made part of securing body 200 within a passage. The attachment, integration, securement or fixing of the engaging member 400 to the securing body 200 may be in a releasable form so that the engaging member 400 may be taken out of the securing body 200 without damaging either structure. For example, the engaging member 400 can take the form of a bolt or some other form such as a cam or a wedge and that the engaging member 400 can be releasably threaded, pressed, pushed or sided into the securing body 200, which may be in the form of a nut-like or cylindrical or conical component. The engaging member 400 may be integrated into securing body 200 in various other configurations and the possible embodiments of the invention should not be limited to the embodiments specifically disclosed herein.

As shown in the drawings, securing member 300 and securing body 200 appear to be similar in size and shape to a bolt-like and a nut-like component, respectively. However, other lengths, sizes, or shapes of securing member 300 and/or securing body 200 may be used in some embodiments.

In one example embodiment the securing member 300 may have a first end 310 and a second end 320. The second end 320 may be a machined end and may have a generally uniform or smooth surface generally corresponding to the surface or periphery of one or more retention members 500. That is, the curvature of the second end 320 of the securing member 300 may generally match or conform to the curvature of the retention member 500. A retention member 500 may be for example a cable, a rope, a wire, or any structure that may be capable of holding a weight and retained within a passage of a securing body.

In another embodiment, the second end 320 of the securing member 300 has a smooth, curved (or concave), inward-facing surface that generally resembles a somewhat C or U shape, as shown in FIGS. 1 and 3A. Together with the first side 230 of the first passage 225, the inner surface portions of the first end 230 and the second end 320 respectively may be contoured to provide respective concave portions that fit relatively closely or snugly around the outer shape (e.g. a curvature or another shape) of a retention member 500. The first side 230 of the first passage 225 and the second end 320 of the securing member 300 may be manufactured in such a way so that they may form a seat or saddle for a live end 520 of a retention member 500. The generally uniform or smooth surface of the second end 320 generally in contact with the retention member 500 may allow the pressure, when secured, to be somewhat distributed evenly on the live end 520 of the retention member 500 and thus may limit excessive stress on the live end 520. This may eliminate a direct force or point load on the live end 520 and may prevent or reduce weakening or damage affecting the performance of the securement apparatus.

A retention member 500, as described earlier, may be a wire, a rope, a cable, combination of cable and attachment bracket, or cable attachment bracket, or thimble, or other suitable feature. However, it should be appreciated that a retention member 500 is not limited to those examples. It may be any body or structure that is capable of resisting force holding some mass or weight ("load") on at least one end. A retention member 500 may have two ends 510 and 520. When connected to a load (not shown), at least one end is connected to the load. The end connected to a load is typically referred to as the live end 520, and the end not connected to a load is typically referred to as the dead end 510. As the live end 520 is the end resisting the force or load, it may provide a resisting force of the system and thus is preferably strong and durable in both static and high stress environments situations or extreme events (e.g. earthquake, bomb blast, wind, securing an object in transit, or construction). The damage and/or stress to the live end 520 of a retention member 500 should be reduced or minimized, and in particular any point or similar load should be eliminated or reduced. To this end, it would be preferable if a surface with which the live end 520 comes into contact is more or less uniform or smooth, and generally corresponds to or matches the outer shape (e.g. a curvature shape) or periphery of the live end 520 of the retention member 500. This way, when external pressure is applied against the live end 520 of the retention member 500, the pressure may be distributed somewhat evenly onto the live end 520 and then transferred (in whole or in part) to the surface in contact with the live end 520. In some cases, if a live end 520 is in close contact with the dead end 510 of the retention member 500 along some length or portion, as shown in the example embodiment, a pressure applied against the dead end 510 could be (in whole or in part) transferred onto the live end 520 along the point or portion of contact. In such cases, it is preferable that the pressure or force transferred onto or applied against the live end 520 is generally evenly distributed along some surface of the live end 520, and may be (in whole or in part) transferred onto the securing body where appropriate and possible.

An engaging member 400 is also shown in FIG. 1. It may be appreciated that an engaging member 400 does not necessarily form part of the securement apparatus 100 or the securing body 200. In some embodiments, an engaging member 400 may be secured to, attached to, integrated with, or otherwise be made part of securing body 200. The attachment, integration, securement or fixing of the engaging member 400 to the securing body 200 can be in a releasable form so that the engaging member 400 may be taken out of the securing body 200 without damaging either structure. For example, the engaging member 400 can take the form of an adjustable set screw or bolt and that the engaging member 400 can be releasable threaded into the securing; body 200, which may be in the form of a nut-like or cylindrical or oval like component. It may be appreciated that the engaging member 400 may be connected with or otherwise secured to securing body 200 in various other configurations and the possible embodiments of the invention should not be limited to the specific embodiments disclosed herein.

As shown in the drawings, engaging member 400 and securing body 200 may be similar in size and shape to a set screw and a nut-like component, respectively. However, other lengths, sizes, or shapes of engaging member 400 and/or securing body 200 may be used in some embodiments. The engaging member 400 will be described in more detail below in connection with FIG. 2.

Figure 2:
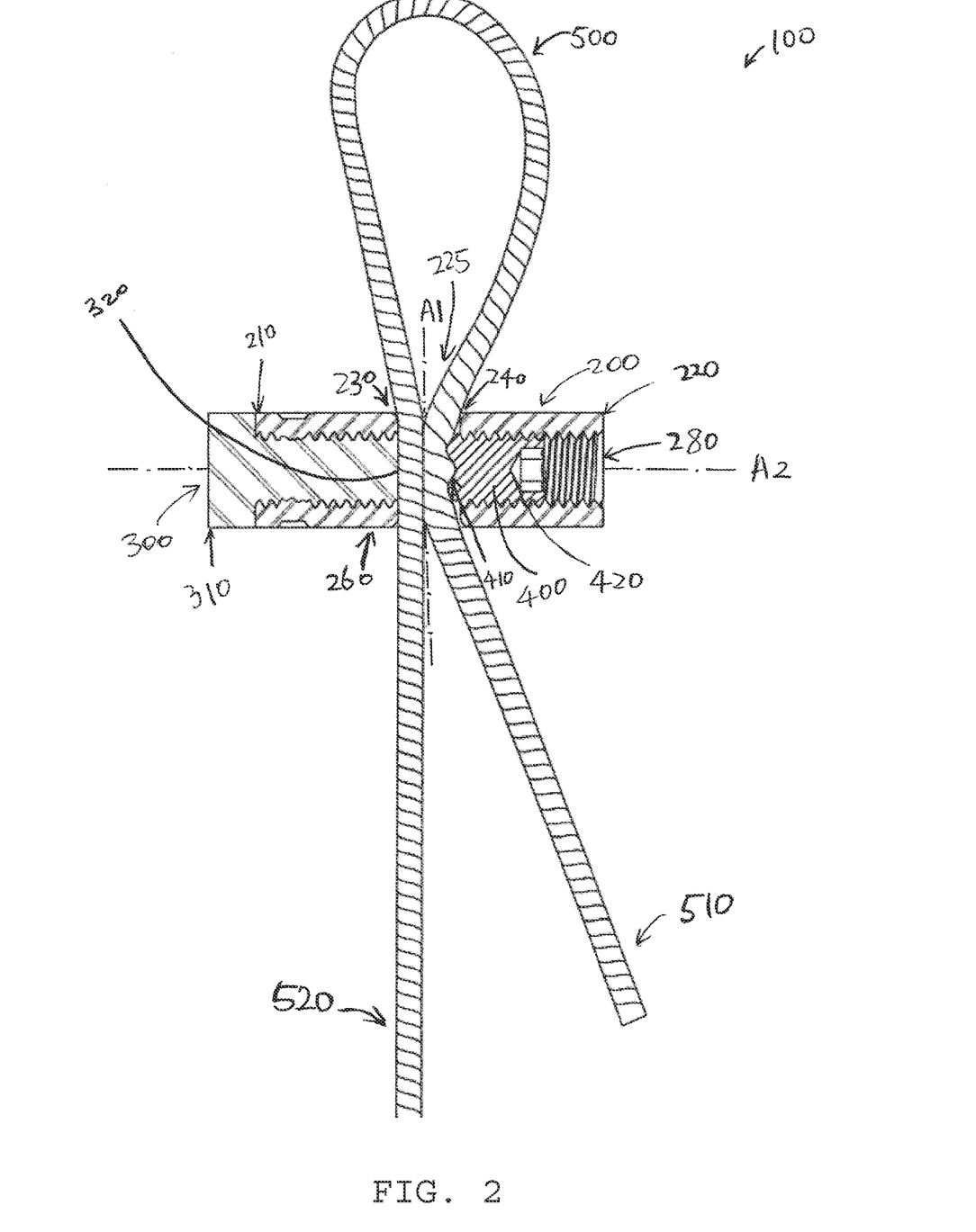
FIG. 2 shows a cross-section view of an example, embodiment of a securement apparatus 100 in operation with a retention member 500.

Turning now to FIG. 2, which is a cross-section view of an example embodiment of a securement apparatus 100 with a retention member 500. It may be appreciated that the retention member 500 does not necessarily form part of the securement apparatus 100, but is included here to better illustrate the relationships between various components of the securement apparatus 100 when operating. Retention member 500 may have a live end 520 with a weight load (not shown), and a dead end 510. Both ends 510 and 520 may be within or through the first passage 225. The retention member may have a loop formed by the two ends, though a loop is not necessary for a retention member 500 to be functional according to one or more aspects of the invention. On a first side 230 of the first passage 225 and adjacent to the first passage 225, there may be a securing member 300 threaded or otherwise inserted into the second passage 280 at the first side 210 of the securing body 200; on the other side 240 of the first passage 225 and adjacent to the first passage 225, there may be an engaging member 400 threaded or otherwise inserted into the second passage 280 at the second side 220 of the securing body 200. The securing member 300 may have a first end 310 and a second end 320. The second end 320 is shown to be in contact with the live end 520 of the retention member 500. Even though not explicitly illustrated in FIG. 2, the second end 320 of the securing member 300 may have a generally uniform or smooth, inward-facing surface that generally resembles a C or U shape, and/or that corresponds to the outer shape or periphery of the live end 520 of the retention member 500. The second end 320 of the securing member 300 may substantially or fully align with the first side 230 of the first passage 225, that is, the surface of the second end 320 and the surface of the first side 230 may be somewhat flush with each other.

The engaging member 400 may have a first end 410 and a second end 420. The first end 410 of the engaging member 400 may be smooth; or alternatively it may be rough or have a generally uneven surface. The engaging member 400 may be inserted (such as threaded) all the way into the second passage 280 of the securing body 200 so that the first end 410 of the engaging member 400 may come into contact with the dead end 510 of the retention member 500, such as shown in FIG. 1 and FIG. 3A. The engaging member 400 may be inserted into the second passage 280 by hand or by any driver or tool that can apply a suitable amount of torque to the securing member 400. For example, an Allen, hex key or a wrench may be used to push or thread the engaging member 400 into the securing body 200.

A user may purchase a securement package or kit for use. The securement kit may include the securing body 200 and a securing member 300. The securement kit may further include an engaging member 400 and a matching Allen/hex key. Alternatively, the securement kit may not include an engaging member 400 if the engaging member 400 may be otherwise obtained. The securement kit may further include a retention member 500 for use with the securement apparatus. Such a retention member 500 can for example be a cable, a rope or a wire. It may be made of steel, copper, iron, high-strength fiber or any other suitable material.

During operation, in an example embodiment, a user may first ensure that a securing member 300 is properly secured, attached of otherwise connected to the securing body 200 so that the second end 320 of the securing member 300 generally or substantially aligns with the first side 230 of the first passage 225 of the securing body 200. The user may use his or her hand, or any suitable tool or driver to adjust the position of the securing member 300 inside the securing body 200. The user next may insert a retention member 500 through the first passage 225 so that both the live end 520 and the dead end 510 are within the first passage 225. The user may then use his or her hand, or any suitable tool or driver to secure, attach, insert or thread the engaging member 400 into the second passage 280 of the securing body 200 from the second end 220, so that the first end 410 of the engaging member 400 may be tightly or snugly secured or encouraged against the dead end 510 of the retention member 500. The user may then connect a load to or otherwise attach to the live end 520 of the retention member 500, and further adjust the engaging member 400 with hand or any suitable tool or driver in order to fix or otherwise secure the retention member 500 in place with a weight load or a potential load. In another example, the retention member 500 so secured may have a loop forming with the two ends 510 and 520. This loop may then be hung on or otherwise attached to another structure, such as a wall, a cabinet, or a ceiling. This loop may provide resistance, agility, buffer and/or flexibility to prevent breaking or otherwise loosening of the weight load in static or high stress situations.

In another example this can be offered as a pre-assembled kit, where a cable wire or wire rope or other feature is fished or provided through the first passage 225 of the securing body to form a retention member 500, where the live end section 520 is seated against the first side 230 of the first passage 225 of the securing body 200, and optionally against second end 320 of the securing member 300, and optionally against the dead end section 510, which may be located next to the live end section 520. The engaging member 400 may be assembled inside the securing body and may be snug against the dead end section 510. The user then may be required to pull the cable, wire or wire rope to adjust the length and then may use his or her hand, tool, torque wrench or other feature to secure engaging member 400.

Figure 4:
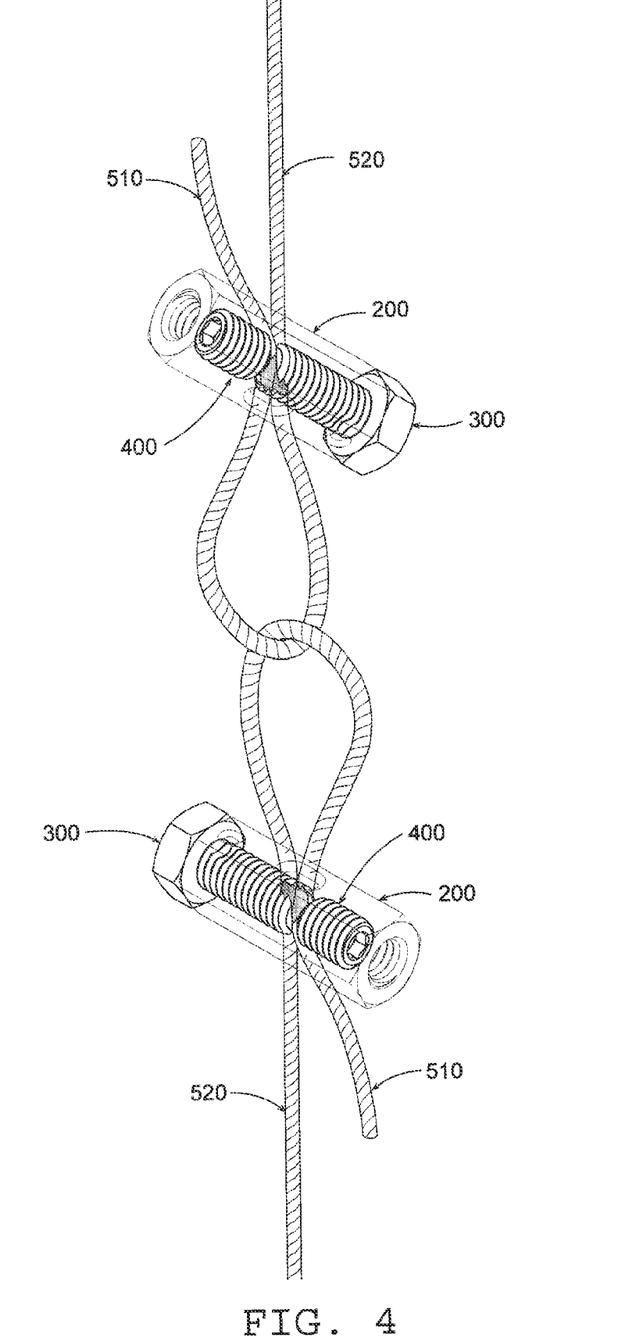
FIG. 4 shows a perspective view of an example embodiment of two securement apparatus in operation with two retention members.
Figure 5:
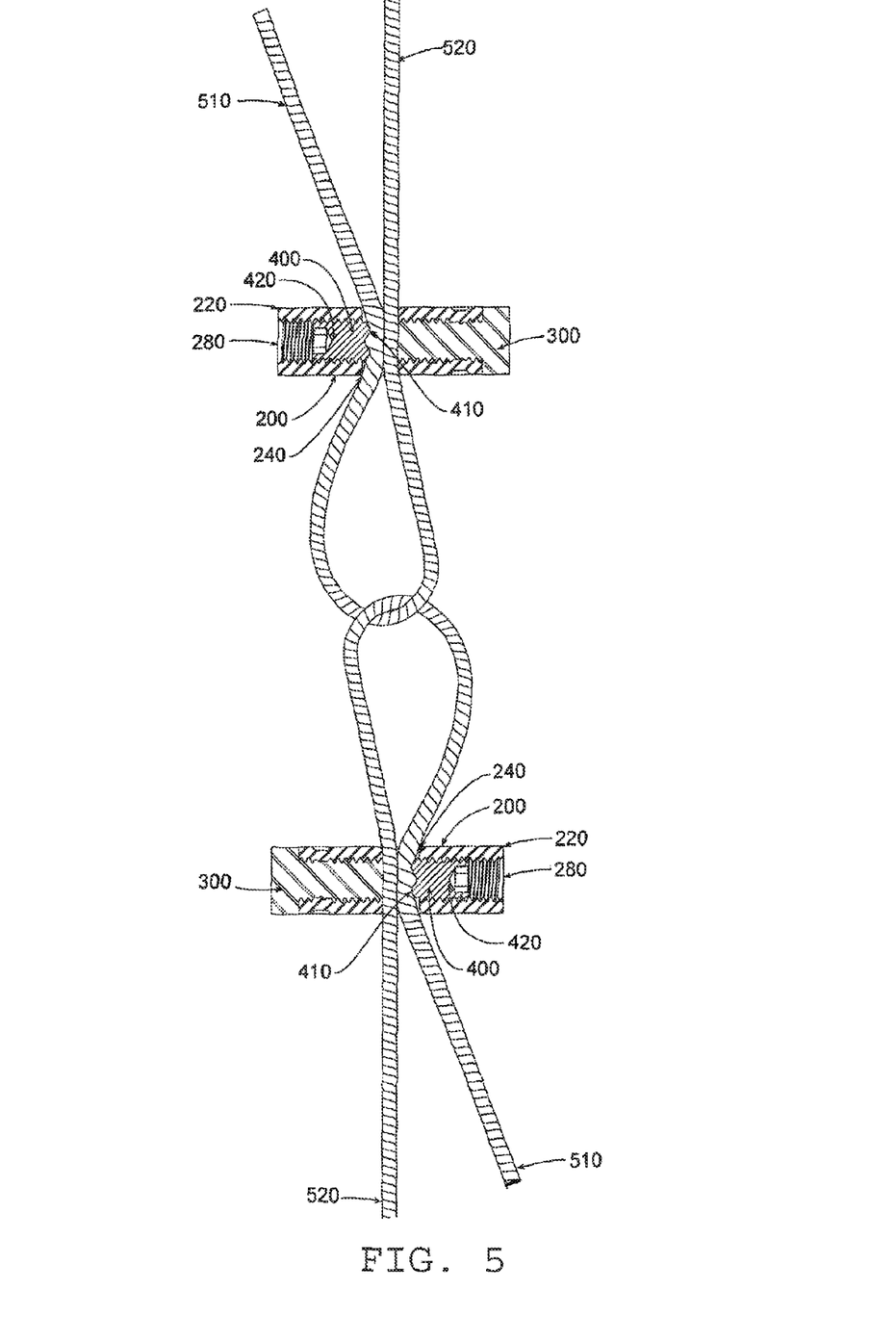
FIG. 5 shows a cross-section view of an example embodiment of two securement apparatus in operation with two retention members.

In yet another example, as shown in FIGS. 4 and 5, which demonstrate an example embodiment of two securement apparatus in operation with two retention members, this device may be used for splicing or otherwise joining two or more cables to obtain advantages such as a longer length. As can be seen from FIGS. 4 and 5, two retention members, each forming a loop secured by a securement apparatus, may be joined together to provide longer length. In one possible embodiment, one live end 520 can be secured or attached to a structure, object, fixture, wall, or a ceiling; and the other live end 520 may also be secured or attached to another structure, object, fixture, wall, a cabinet, or a weight load. The two loops may be joined, linked or intertwined together as to form a secure and reliable connection between the two retention members and thus between the two live ends 520 and their respective loads or attachments. In another embodiment, each of two live ends 520 may be secured or otherwise attached to an objection in motion, such as an airplane or a vehicle. That is, the two objects in motion may be reliably and securely connected with the embodiment shown in FIGS. 4 and 5. One possible usage scenario may be that one aircraft needs to deliver and/or transfer fuel to another aircraft, and it may be necessary to tie one aircraft to the other during the fueling process. The two securement apparatus linked to ether by the loops of retention members may provide the appropriate resistance, agility, buffer and/or flexibility in such unusual and high stress situations. The figures are provided for illustrative purpose only; applications are not limited to the illustrations shown.

Figure 6:
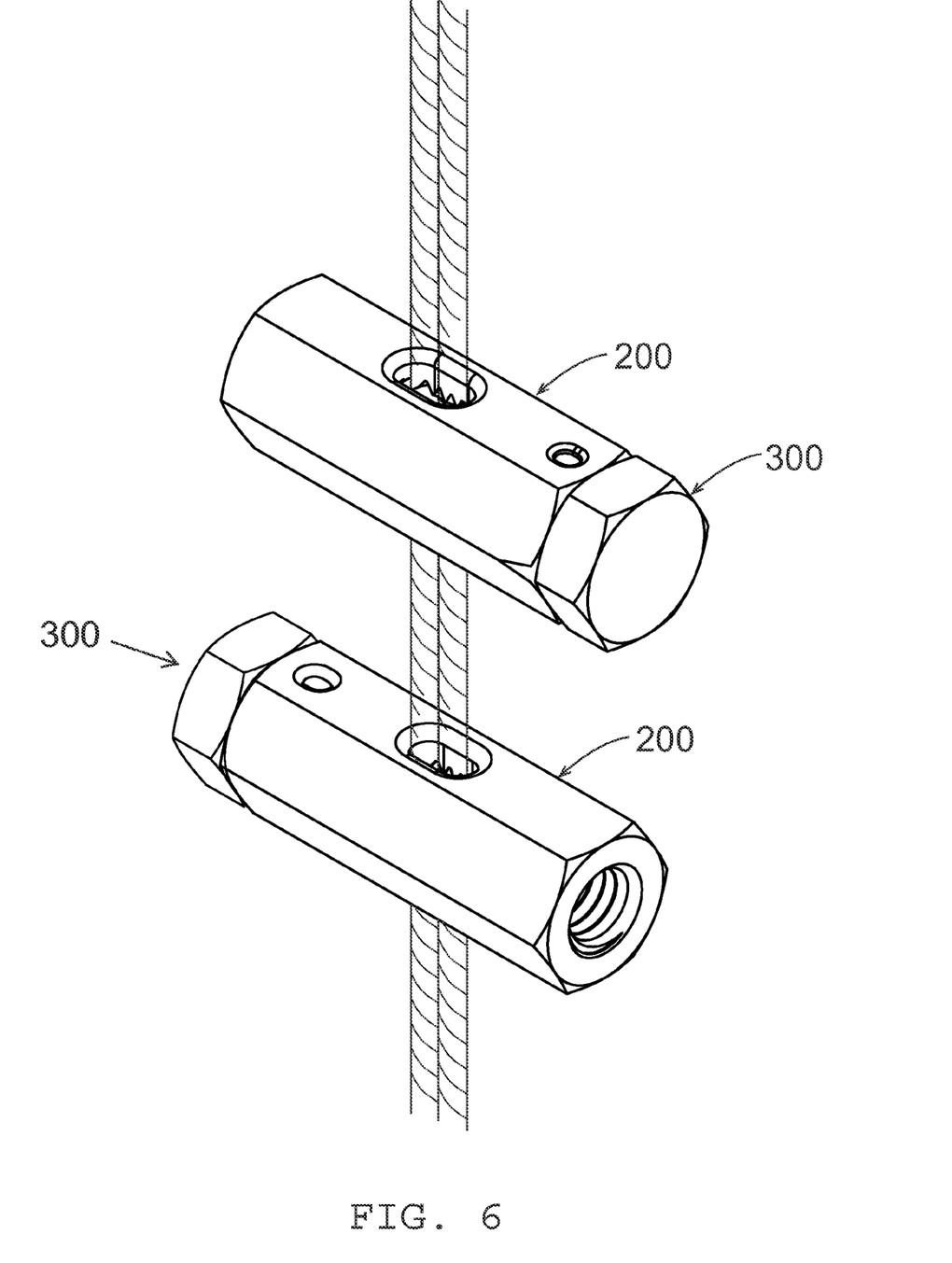
FIG. 6 shows a perspective view of another example embodiment of two securement apparatus in operation with one or more retention members.
Figure 7:
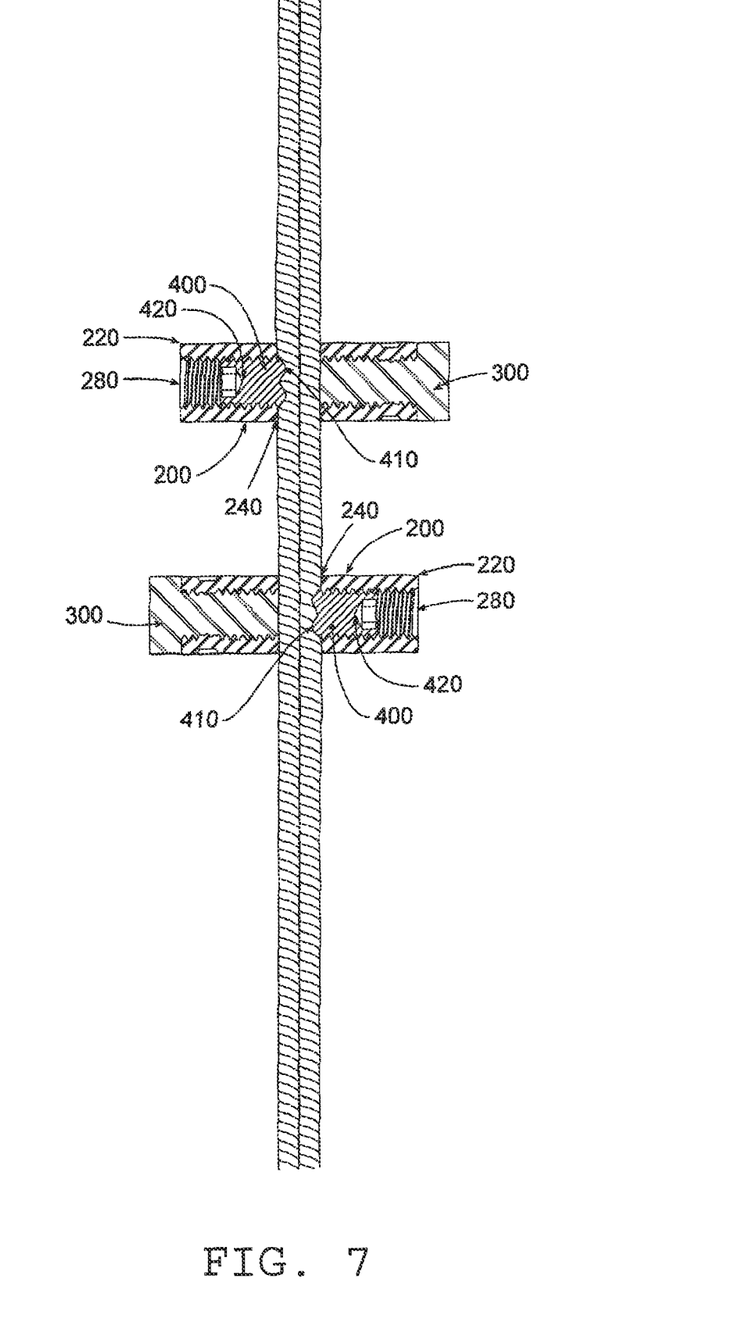
FIG. 7 shows a cross-section view of another example embodiment of two securement apparatus in operation with one or more retention members.

In still another example, as demonstrated in FIGS. 6 and 7, which show another example embodiment of two securement apparatus in operation, two or more securement apparatus may be used to secure one or more retention members, where the retention members may go through a first passage of each securement apparatus. The figures are provided for illustrative purpose only; applications are not limited to the illustrations shown.

Such application of a securement apparatus 100 may require minimum torque or force (applied by at least the engaging member) to fix a retention member 500 (e.g. a steel cable) with a weight load onto structures and to provide an industry standard safety factor based on the minimum breaking strength of the retention member 500. In addition, since there is limited or no sharp edge or small radius in the surface area in contact with the live end 520 of the retention member 500, the securement apparatus 100 may prevent the possibility of biting into the retention member 500, causing damage or weakening the live end 520 and leading to possible failure of the securement apparatus.

In one example embodiment according to one or more aspects of the invention, using a nut-like component as the securing body, a bolt as the securing member, a set screw as the engaging member, and a cable as the retention member, enough force may be applied to retain generally at least one of the dead end and the live end of the cable. Force of the bolt/set screw may be transferred, preferably evenly, by the dead end to the live end of the cable seated on the feature or saddle created by the generally uniform or smooth, curved surfaces of the bolt and the nut-like component in the first passage. This may reduce any direct force or point load on the live end and could prevent weakening or damage affecting the performance of the securement apparatus when connected to a load.

In another example embodiment according to one or more aspects of the invention, a securement apparatus kit may be packaged and provided. The kit could include an instruction manual including instructions in appropriate languages to teach a user how to use the securement apparatus. The kit may include two or more of: at least one securing body, at least one securing member, at least one engaging member, and/or at least one retention member. The kit may further include any or no appropriate tools or drivers for use with the securement apparatus. In a preferred embodiment, the securing body may have a securing member pre-inserted into the securing body. However, a securing member may be separate from the securing body, and a user could choose to install the securing member and the securing body together with hands and/or suitable tools. In yet another embodiment, the kit may include at least one securing body 200 with a round or oval-shaped first passage 225, and separate from the securing body 200, the kit may also include multiple engaging member 400 or securing member 300, each securing member 300 may have a uniquely shaped second end 320. This is so that the user may pick the desired securing member 300 with a desired shape at the second end 320 in order to fit a retention member 500. The kit in this scenario may further include different kinds of retention members 500 and/or different engaging members 400.

MANUFACTURING OF THE SECUREMENT APPARATUS

A manufacturing process of a securement apparatus according to one or more aspects of the invention is described next. The ordering of steps may be changed or varied as needed. A first step in the manufacturing process may be to insert, attach, or otherwise secure a securing member 300 into a securing body 200. A second step is to form a passage or a hole through the securing body 200, which may become first passage 225, such that the passage or the hole may be formed through both the securing body 200 and part of the securing member 300, destroying the end of the securing member 300 to form a new second end 320 of the securing member 300. Optionally the passage or hole is formed so that the second end 320 of the securing member 300 may have a generally uniform or smooth, curved (or concave), inward-facing surface that generally resembles a C or U shape, such as a saddle or seat that generally corresponds to the outer shape or periphery of the live end 520 of a retention member 500. The second end 320 of the securing member 300 may also substantially or generally align with the first side 230 of the first passage 225, that is, the surface of the second end 320 and the surface of the first side 230 may be somewhat flush with each other. In a preferred embodiment, the first side 230 of the first passage 225 and the second end 320 of the securing member 300 are machined in such a way that the inner surface portions of the first end 230 and the second end 320 respectively are contoured to provide respective concave portions that fit relatively closely or snugly around the outer shape (e.g. a curvature shape) or periphery of a retention member 500. In some other examples, the second end 320 of the securing member 300 and/or the first side 230 of the first passage 225 of the securing body 200 can also take the shape of a quoit, a torus, a toroid, a quonset, an oblate spheroid, prolate spheroid, a segment bf a sphere, a spherical wedge, an arch, a camber, a kidney, obround, oval, a pyriform, a crescent, or any other suitable shape that has a smooth, gradual curve.

In one example embodiment, during the forming of the first passage 225, the machining process may permanently or semi-permanently alters an original part or end of the securing member 300, forming a new end 320 of the securing member 300, such that the securing member 300 may be permanently or semi-permanently molded to, attached to or otherwise fixed to the securing body 200. During this process, the securing member 300 may lose part of its original functionality. For example, in one embodiment, the securing member 300 may be a bolt, which may have its end permanently or semi-permanently altered, or may even be destroyed, by the machining process, such that the bolt may not function properly (i.e., serving its original, typical purpose of a fastener) outside of the securement apparatus. In another embodiment, the securing member 300 may be a screw, which may have its end altered by the machining process in the forming of a first passage 225 of the securing body 200. Through the machining process which may alter an original part or end of a securing member 300, a new end 320 of the securing member 300 is formed. This new end 320 may have a generally uniform or smooth surface afforded by the machining process. Somewhat flush with the first side 230 of the formed first passage 225, the new end 320 of the securing member 300 may be part of a feature, a seat or a saddle that generally conforms to a periphery or outer shape of one or more retention members 500. A process of forming a passage or a hole in a securing body 200 in which an original part or end of a securing member 300 is permanently or semi-permanently altered may thus encourage the securing body 200 to be crimped, welded, glued (using chemical agents), damaged, destroyed or altered to hold the securing member 300 in place, where the formed passage may intersect with an end 320 of the securing member 300 to define a generally uniform or smooth surface.

In another example, securing member 300 may be seated against surface 210 of securing body 200 and the assembly may be punched or crimped together at one or multiple locations to secure in place securing member 300 permanently before or after the machining process for creating passage 225.

In yet another example, securing member 300 can be part of the securing body 200. This may be done through either machining process, molding/casting process and or combination of both machining and molding/casting processes. In such case side 230 of passage 225 of securing body 200 and end 320 of securing member 300 may become one part.

The forming of the passage or hole may be done by drilling, plasma, laser-cutting, die-cast, machining or any other suitable means of forming a passage through an object.

In one example embodiment, each component in a securement apparatus 100 may be sourced from off-the-shelf products or readily available hardware. For example, the securing body 200 may be a nut or a coupling nut, the securing member 300 may be a bolt or screw or a set screw, and the engaging member 400 may be a set screw or any type of bolt or set screw. All of these components may be obtained easily and are inexpensive from many suppliers.

The embodiments of the present disclosure described above are intended to be examples only. Alterations, modifications and variations to the disclosure may be made without departing from the intended scope of the present disclosure. In particular, selected features from one or more of the above-described embodiments may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

The invention claimed is:

1. A securement apparatus comprising:
a securing body including:
a first passage therethrough for receiving one or more retention members in a looped configuration with first and second legs of the loop extending through the first passage, wherein a first side of the first passage has a generally uniform surface generally configured to conform to a periphery of at least one of the one or more retention members; and
a second passage meeting the first passage; and
an engaging member securable within said second passage, the engaging member being positionable within the second passage to retain the one or more retention members within the first passage by encouraging a position of the one or more retention members to rest within the surface and by pinching both the first and second legs of the loop between the surface and the engaging member,
a securing member, wherein an end of the securing member defines the surface and is retained within a third passage of the securing body, the third passage meeting the first passage, and wherein the third passage is threaded and the securing member is a bolt threaded therein, the bolt being destructively held in place by the first passage intersecting an end of the bolt to define the surface.

2. The securement apparatus of claim 1, wherein the generally uniform surface is a smooth surface.

3. The securement apparatus of claim 1, wherein the generally uniform surface is a curved surface.

4. The securement apparatus of claim 1, wherein the second passage is threaded and the engaging member threaded therein, and wherein the engaging member is securable within the second passage.

5. A securement apparatus kit comprising:
a securing body;
an engaging member; and
one or more retention members;
wherein the securing body includes:
a first passage therethrough for receiving the one or more retention members in a looped configuration with first and second legs of the loop extending through the first passage, wherein a first side of the first passage has a generally uniform surface generally configured to conform to a periphery of at least one of the one or more retention members; and
a second passage meeting the first passage,
wherein the engaging member is securable within said second passage, the engaging member being positionable within the second passage to retain the one or more retention members within the first passage by encouraging a position of the one or more retention members to rest within the surface and by pinching both the first and second legs of the loop between the surface and the engaging member, and
wherein the securing body further comprises a securing member, wherein an end of the securing member defines the surface and is retained within a third passage of the securing body, the third passage meeting the first passage, wherein the third passage is threaded and the securing member is a bolt threaded therein, the bolt being destructively held in place by the first passage intersecting an end of the bolt to define the surface.

6. The securement apparatus of claim 5, wherein the generally uniform surface is a smooth surface.

7. The securement apparatus of claim 5, wherein the generally uniform surface is a curved surface.

8. The securement apparatus of claim 5, wherein the second passage is threaded and the engaging member threaded therein, and wherein the engaging member is securable within the second passage.

9. The securement apparatus of claim 5, further comprising a second securing body and a second engaging member.

\* \* \* \* \*